Oct. 23, 1928.
A. E. HYLAND
1,688,930
SPRING HINGE
Filed Nov. 21, 1927
Fig. 1.
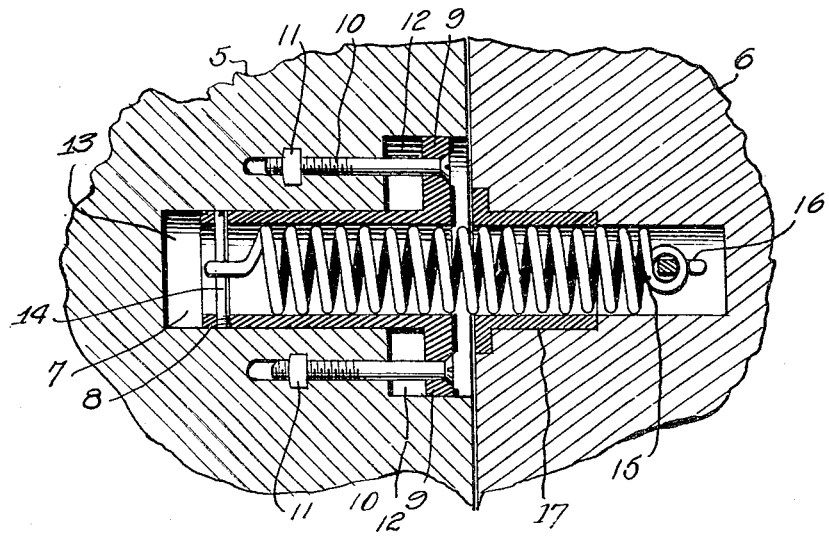
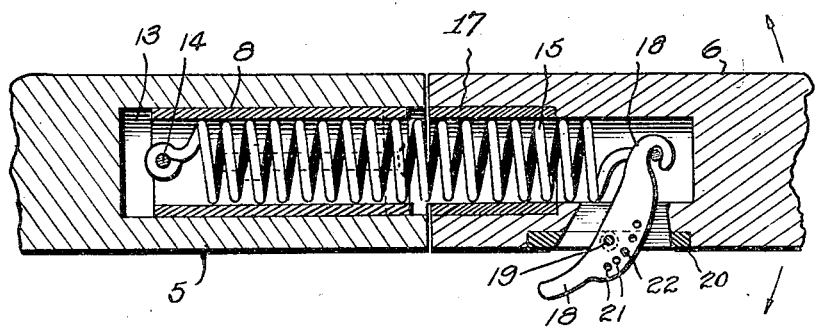
Fig. 2.
Inventor
Alfred E Hyland
By Davis & Davis
Attorneys Patented Oct. 23, 1928.

1,688,930

UNITED STATES PATENT OFFICE.

ALFRED E. HYLAND, OF KEESEVILLE, NEW YORK.

SPRING HINGE.

Application filed November 21, 1927. Serial No. 234,715.

This invention relates to that type of double-spring hinges in which tension coil-springs form the only connection between the swinging-member and the stationary-member, and the swinging-member is permitted to swing in both directions, and the present invention is especially intended to provide simple means for increasing the tension on the coil-springs from time to time as the springs age, to thereby prevent the swinging-member sagging, as more fully hereinafter set forth.

In the drawing:—

Fig. 1 is a vertical sectional view;

Fig. 2 is a horizontal sectional view of a hinge constructed in accordance with my invention.

In the drawing, 5 designates the stationary-member, which may be a door-jamb or other stationary support, and 6 designates the swinging-member, which may be a door, for instance. These parts, of course, may be reversed.

In the edge of the member 5 is formed a cylindrical bore 7 and in this bore is fitted a bushing 8 provided with a pair of lugs 9 at its outer end, which are provided with bolt-holes. Bolts 10 pass through these holes and into bolt-passages formed in the member 5. Buried nuts 11 engage the threaded ends of these bolts. These bolts and nuts permit the bushing 9 to be advanced or retarded in its bore 7, clearances 12 being provided under the lugs 9 and a clearance 13 being provided at the inner end of the bushing 8 to permit of this longitudinal adjustment of the bushing 8. Across the bushing 8, at its inner end, extends a pin 14 to which one end of the coil hinge spring is anchored.

The other end of the coil-spring 15 is provided with an eye 16 which lies in a bore formed in the swinging-member 6 and protected by a bushing 17. This eye 16 is engaged by the hooked end of the lever 18 pivotally mounted at 19 on a plate 17 set in a recess in one face of the door 6. The outer end of the lever 18 extends beyond the plate 20 for convenience in manipulation. The lever is provided with a series of holes 21 through any one of which a pin 22 may be passed, which pin will lie against the face of the plate 20 by reason of the tension of the coil-spring 15.

It will be observed that the spring 15 may be tensioned by screwing up the bolts 10 and also by tightening the lever 18. This lever is tightened by pressing on the projecting end of the lever 18 until the desired tension is obtained on the spring 15, and then the lever is locked in its adjusted position by inserting the pin 22 in the proper hole 21. By reason of these simple tensioning devices, the proper tension on the spring 15 may be obtained in order to prevent the door from sagging, and thus the hinge may be kept in perfect working condition for a long while. It will be understood that the nuts 11 are mortised into the member 5, and that the mortise-holes are plugged with wood for appearance sake. It is desirable that the sides of the nuts shall fit the sides of the mortise so they may not turn when the screws are turned.

What I claim as new is:

1. A spring-hinge appliance embodying a bushing set in a bore in one of the members and provided with lateral lugs, clearances being provided in said member underneath said lugs and at the inner end of the bushing, bolts extended through said lugs into the member, nuts engaging the threaded ends of said bolts and buried in said member, a coil-spring having one end inserted in said bushing and anchored to the inner end thereof, and means in the swinging-member for engaging the opposite end of said spring.

2. A spring-hinge appliance embodying a bushing set in a bore in one of the members and provided with lateral lugs, clearances being provided in said member underneath said lugs and at the inner end of the bushing, bolts extended through said lugs into the member, nuts engaging the threaded ends of said bolts and buried in said member, a coil-spring having one end inserted in said bushing and anchored to the inner end thereof, and means in the swinging-member for engaging the opposite end of said spring, said swinging-member being bored to receive the spring and said means for engaging this end of the spring consisting of a swinging-lever engaging the end of the spring and mounted on the swinging-member, and devices for locking this lever in its adjusted position.

3. In a double-spring hinge-appliance, a coil-spring extending into the bores in the stationary-member as well as in the swinging-member, means for anchoring one end of the spring to the stationary-member, and means for adjustably anchoring the other end of the spring to the swinging-member, this means consisting of a swinging-lever extending into the bore and hooked to the end of the spring, this lever being pivotally mounted on the swinging-member and provided with a series of holes, and a removable lock-pin engaging one or the other of these holes.

In testimony whereof I hereunto affix my signature.

ALFRED E. HYLAND.